(12) United States Patent
Evens et al.

(10) Patent No.: US 6,465,584 B1
(45) Date of Patent: Oct. 15, 2002

(54) ELASTOMERIC COPOLYMER AND PROCESS FOR THE PREPARATION THEREOF

(75) Inventors: Georges G. Evens, Maasmechelen (BE); Emanuel M. J. Pijpers, Beek (NL); Andreas A. Oosterlaken, Stein (NL); Jacob Renkema, Born (NL); Henri J. H. Beelen, Heerlen (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/472,508

(22) Filed: Dec. 27, 1999

Related U.S. Application Data

(63) Continuation of application No. PCT/NL98/00369, filed on Jun. 25, 1998.
(60) Provisional application No. 60/056,079, filed on Aug. 27, 1997.

(30) Foreign Application Priority Data

Jun. 27, 1997 (NL) .............................................. 1006421

(51) Int. Cl.$^7$ ........................... C08F 4/44; C08F 236/02; C08F 236/20
(52) U.S. Cl. ..................... 526/124.3; 526/281; 526/282; 526/283; 526/336; 526/348.6; 526/901; 526/916; 502/117; 502/104
(58) Field of Search .................................. 526/901, 916, 526/89, 348.6, 108, 120, 281, 282, 283, 336, 124.3

(56) References Cited

U.S. PATENT DOCUMENTS

| | | |
|---|---|---|
| 4,510,303 A | 4/1985 | Oda et al. |
| 5,698,651 A | 12/1997 | Kawasaki et al. |
| 5,763,533 A | 6/1998 | Dharmarajan et al. |

FOREIGN PATENT DOCUMENTS

| | | |
|---|---|---|
| EP | 0044119 A2 | 1/1982 |
| EP | 0 044 119 A2 * | 1/1982 |
| EP | 0094051 A1 | 11/1983 |
| EP | 0680976 A1 | 11/1995 |
| EP | 0751156 A2 | 1/1997 |
| WO | WO 95/30698 | 11/1995 |
| WO | WO 96/12744 | 5/1996 |
| WO | WO 97/01586 | 1/1997 |

* cited by examiner

*Primary Examiner*—David W. Wu
*Assistant Examiner*—R. Harlan
(74) *Attorney, Agent, or Firm*—Pillsbury Winthrop, LLP

(57) ABSTRACT

The invention relates to an elastomeric copolymer derived from components comprising a) ethylene, b) an α-olefin, c) a non-conjugated polyene (C) having one C=C bond that is copolymerizable using a Ziegler-Natta catalyst, and d) optionally a non-conjugated polyene (D) which in the molecule contains two or more C=C bonds that are copolymerizable using a Ziegler-Natta catalyst. The copolymer is characterized by, inter alia, a specific branching coefficient BC. The invention also relates to a process for the preparation of such copolymers.

24 Claims, No Drawings

ELASTOMERIC COPOLYMER AND PROCESS FOR THE PREPARATION THEREOF

This application claims the benefit of U.S. Provisional Application No. 60/056,079, filed Aug. 27, 1997. This application is a continuation of PCT/NL98/00369, filed Jun. 25, 1998.

The invention relates to an elastomeric copolymer derived from components comprising a) ethylene,
b) an $\alpha$-olefin,
c) a non-conjugated polyene (C) having one C=C bond that is copolymerizable using a Ziegler-Natta catalyst, and
d) optionally a non-conjugated polyene (D) which in the molecule contains two or more C=C bonds that are copolymerizable using a Ziegler-Natta catalyst; the invention also relates to a process for the preparation of such an elastomeric copolymer.

An elastomeric copolymer of ethylene, an $\alpha$-olefin and one or more non-conjugated polyenes is already known and described in EP 94.051 A. Such a product has rubber-like properties and is here and hereinafter denoted as EADM (products based on ethylene, an $\alpha$-olefin and a diene). An elastomeric copolymer is here and hereinafter understood to be a copolymer which, at room temperature and higher temperatures, has a crystallinity of at most 5%, measured by means of DSC (differential scanning calorimetry).

Elastomeric copolymers are characterized by a number of parameters. Besides the weight percentage of the monomer units there is the molecular weight (expressed as number average (Mn) or weight-average molecular weight (Mw)), the molecular weight distribution (MWD, defined as Mw/Mn), as well as the degree of branching. The value of the degree of branching is determined by means of the Mark-Houwink equation, which gives the relation between the molecular weight (M) and the intrinsic viscosity ($\eta$) of the copolymer. For a pure copolymer without long chain branching the relation between log ($\eta$) and log (M) is described by a linear relation. Long chain branching results in a deviation of the linear relation between log ($\eta$) and log (M). The relation between log ($\eta$) and log (M) becomes less linear as the degree of branching increases.

A Size Exclusion Chromatography—Differential Viscometry combination (SEC-DV) is used to determine molecular weight distributions (MWDs) and degree of branching for the elastomeric copolymers in conformity with the universal calibration principle as described in Z. Grubistic, R. Rempp, H. Benoit, J. Polym. Sci., Part B, 5, 573 (1967). It holds that log [$\eta_i$*M$_i$] vs retention volume=constant, (with [$\eta_i$] representing the intrinsic viscosity, M$_i$ the molecular weight and "i" being the $i^{th}$-elution fraction in the SEC-DV chromatogram). The experimental Mark-Houwink equation yields information on the degree of branching if this equation is compared with the Mark-Houwink equation for linear polymers, which is used as reference. Branching is understood to be a branch in the polymer chain, which is longer than a branch produced by the incorporation of a single molecule of the $\alpha$-olefin or of a polyene. The reference Mark-Houwink equation is dependent on the average ethylene/$\alpha$-olefin composition of the polymer. According to Th. G. Scholte, N. L. J. Meijerink, H. M. Schoffeleers, A. M. G. Brands, J. of Appl. Pol. Sci., Vol, 29, 3763–3782 (1984) the following holds for the Mark-Houwink equation of a linear ethylene-propylene (EP) copolymer:

$$[\eta]^* = (1 - \tfrac{1}{3}*W_3)^{(1+a)} . K_{PE} . (M_v^*)^a \quad \text{(I)}$$

where:

[$\eta$]*=apparent weight-average intrinsic viscosity of a linear copolymer with an ethylene/$\alpha$-olefin composition corresponding to that of the elastomeric copolymer (in dl/g)

$W_3$=propylene weight fraction $K_{PE}$=Mark-Houwink constant for linear polyethylene (PE) (=4.06.10$^{-4}$), measured in 1,2,4-trichlorobenzene at 135° C.

a=Mark-Houwink constant for linear polyolefinic copolymers (=0.725), measured in 1,2,4-trichlorobenzene at 135° C.

$M_V^*$=apparent, viscosity-average molecular weight, defined as:

$$M_v^* = \left( \frac{\sum w_i (M_i^*)^a}{\sum w_i} \right)^{1/a} \quad \text{(II)}$$

where:

$w_i$=weight fraction belonging to elution fraction i $M^*_i$=apparent molecular weight, for elution fraction i $W_3$ is calculated for such a copolymer according to the formula:

$$W_3 = C_3/(C_3 + C_2) \quad \text{(III)}$$

where $C_2$ and $C_3$ represent, respectively, the ethylene content and the propylene content of the EP copolymer (in mass %).

For other $\alpha$-olefin copolymers the value of [$\eta$]* is corrected according to the guidelines presented in the above-mentioned article by Scholte c.s.

The degree of branching is quantified according to the branching parameter, g' (III), defined as:

g' (III) degree of branching=$([\eta]/[\eta]^*)^{1.725}$ (IV)

[$\eta$]=measured weight-average intrinsic viscosity (in dl/g)

[$\eta$]*=apparent weight-average intrinsic viscosity of a linear copolymer with an ethylene/$\alpha$-olefin composition corresponding to that of the elastomeric copolymer (dl/g).

For this, see: L. I. Kulin, N. L. Meijerink, P. Starck, Pure & Appl. Chem., vol. 60, No. 9, 1403–1415 (1988) and S. Shiga, Polym. Plast. Technol. Eng., 28(1), 17–41 (1989).

Elastomeric copolymers have now been found, and these are the subject of the present invention, which had not been known hitherto and which display different branching characteristics. Thus the invention relates to elastomeric copolymers having a strongly deviating rheological behaviour as a function of the composition compared with the known copolymers.

The elastomeric copolymer according to the invention is characterized in that the elastomeric copolymer has the following properties:

i the weight ratio between the ethylene content and the $\alpha$-olefin content is between 80/20 and 40/60 ii the polyene (C) content is 4 to 30 wt. % iii the polyene (D) content is 0 to 5 wt. % iv a branching coefficient BC, for which the following holds:

$$0.57 - 0.022*[C] \leq BC \leq 0.7 \quad \text{(V)}$$

where $$BC = \frac{g'(\text{III})}{MWD} + 0.25 * RBE * [D]^{0.5} + 0.0855 * [DCPD] \quad \text{(VI)}$$

[C]=polyene (C) content of the polymer (wt. %, relative to the total weight of the polymer),
[D]=polyene (D) content of the polymer (wt. %, relative to the total weight of the polymer),
RBE=relative branching efficiency of the polyene (D) relative to vinyl norbornene (VNB).
[DCPD]=dicyclopentadiene content of the polymer (wt. %, relative to the total weight of the polymer).

Preferably, the elastomeric copolymer according to the invention is characterized in that the elastomeric copolymer has the following properties:

i the weight ratio between the ethylene content and the α-olefin content is between 80/20 and 40/60
ii the polyene (C) content is 4 to 30 wt. %
iii the polyene (D) content is 0 to 5 wt. %
iv a branching coefficient BC*, for which the following holds:

$$0.57 - 0.022*[C] \leq BC^* \leq 0.7 \quad \text{(VII)}$$

where $$BC^* = \frac{g'(\text{III})}{MWD} + \Sigma_D (0.25 * [D]^{0.5}) \quad \text{(VIII)}$$

[C]=polyene (C) content of the polymer (wt. %, relative to the total weight of the polymer),
[D]=polyene (D) content of the polymer (wt. %, relative to the total weight of the polymer).
$\Sigma_D$=sommation of all contributions to BC* of the polyenes D present in the elastomeric copolymer.

An even more preferred embodiment of the present invention is an elastomeric copolymer having a branching coefficient which satisfies the relation:

$$0.6 - 0.022*[C] \leq BC \leq 0.7 \quad \text{(IX)}$$

Formula IX is also valid for BC*.

Such copolymers have a relation between the degree of branching, the molecular weight distribution and composition that is totally different from that of the products described hitherto.

Surprisingly, the copolymers according to the invention have a much higher BC than state of the art copolymers having a comparable composition.

The copolymers according to the invention contain ethylene and an α-olefin, the ratio between ethylene and the α-olefin being between 80/20 and 40/60 (parts by weight). Preferably the ratio is between 70/30 and 40/60. More preferably the ratio is between 65/35 and 45/55. Optionally, several a-olefins may be present. In general such an a-olefin contains 3–20 C atoms (though higher a-olefins are allowable); more preferably the α-olefin contains 3–10 C atoms. It is preferred for the α-olefin to have been chosen from the group consisting of propylene, butene-1, pentene-1, 4-methylpentene-1, hexene-1 and octene-1. The most preferred situation is the one in which the α-olefin is propylene.

Besides the ethylene and the α-olefin also one or more non-conjugated polyenes are present, so that an EADM is obtained. The non-conjugated polyene (C), which in the molecule contains only one C=C bond that is copolymerizable using a Ziegler-Natta catalyst besides at least another C=C bond, can be useful in a subsequent vulcanization of the copolymer. Optionally, a non-conjugated polyene (D), which in the molecule contains two or more C=C bonds that are polymerizable by means of a Ziegler-Natta catalyst, is present. Which C=C bonds are suitable for incorporation in a polyolefin using a Ziegler-Natta catalyst can be read in the book 'Ziegler-Natta catalysts and polymerizations', by John Boor, Jr, Academic Press 1979, chapter 19.

Polyene (C) and polyene (D) in the copolymer according to the invention may be either aliphatic or alicyclic.

Aliphatic polyunsaturated compounds in general contain 3 to 20 carbon atoms, the double bonds preferably being non-conjugated. Examples of aliphatic polyenes (C) are: 1,4,8-decatrienes, 1,4-hexadiene and 4-methyl hexadiene 1,4. Examples of aliphatic polyenes (D) are: 1,4-pentadiene, 1,5-hexadiene, 1,7-octadiene and 1,4,9-decatriene.

Alicyclic polyunsaturated compounds, with or without a bridging group, may be either monocyclic or polycyclic. Examples of alicyclic polyenes (C) are alkylidene norbornenes, in particular the 5-alkylidene norbornenes-2, in which the alkylidene group contains 1 to 20, and preferably 1 to 8, carbon atoms, and some alkenyl norbornenes, in particular the 5-alkenyl norbornenes-2, in which the alkenyl group contains 2 to 20, and preferably 2 to 10, carbon atoms and in which the alkenyl group does not contain a terminal C=C bond, for instance 5-(2'-methyl-2'butenyl)-norbornene-2 and 5-(3'-methyl-2'butenyl)-norbornene-2. Examples of alicyclic polyene (D) are vinyl norbornene, norbornadiene and dicyclopentadiene. As polyene (D) use is made in particular of dicyclopentadiene, vinyl norbornene, norbornadiene or 1,5-hexadiene. Mixtures of the compounds described in the above may also be used.

The polyene (C) is present in the copolymer in amounts of 4 to 30 wt. %, preferably from 4 to 15 wt. %. In the absence of polyene (D) the amount of polyene (C) is preferably 5 to 20 wt. %, more preferably 7 to 15 wt. %.

The polyene (D) may be present in the copolymer in amounts from 0 to 5 wt. %, preferably from 0.1 to 2 wt. %.

The new copolymers according to the invention can be characterized using material properties known in themselves, such as molecular weight (Mw or Mn), the molecular weight distribution (MWD) and, since they also have an elastomeric character, a Mooney viscosity ($M_L^{1+4}$, 125° C.). The Mooney viscosity ($M_L^{1+4}$, 125° C.) is measured in conformity with ISO 289 and is a measure of the product's plasticity. The copolymer preferably has an Mw of at least 1000; another preference is for a copolymer with a Mooney viscosity ($M_L^{1+4}$, 125° C.) of at least 20, more preferably at least 40. Such products offer good processing properties together with a good combination of product properties. This holds in particular for products with an MWD value between 1.8 and 4.0.

The copolymers are special because of the nature and the amount of branching: branching is distributed homogeneously over all polymer chains, while the MWD remains narrow. This results in a combination of superior processing of the polymer and favourable rubber characteristics.

In the absence of polyene (D) the copolymer has little branching. Cationic reactions via polyene (C) have virtually not occurred. In the presence of polyene (D), branching is caused mainly by incorporation of the polyene (D) via the Ziegler-Natta copolymerization mechanism.

The branching coefficient (BC) is a measure of the branching caused by cationic reactions. The polymers of the invention have a very high BC value, which implies that few cationic side reactions have occurred.

The incorporation of polyene (D) also has an effect on the branching, and thus on the BC and BC*. This effect can simply be corrected (see formulas VI and VIII). For an adequate correction of BC the following are needed: the content of polyene (D), [D], and the relative branching efficiency, RBE, of the polyene (D) used, determined relative to VNB (see formula VI). The polyene (D) content is determined by means of Fourier Transform InfraRed spectroscopy (FT-IR). The RBE is determined by synthesizing two copolymers with an ethylene/α-olefin weight-ratio of 50/50 and a third monomer content of, respectively, 1 wt. % polyene (D) used or 1 wt. % VNB. The RBE of VNB is 1 by definition. For an adequate correction of BC* the content of polyene (D) is needed.

For the determination of the RBE, polymers are prepared in a continuous polymerisation reaction, which is being operated under (semi)-commercial steady-state conditions. A polymerization reaction is carried out under such steady state conditions that all conditions (like monomer content and monomer ratio, the polymer content, the temperature, stirring and the catalyst concentration) are constant. Under these conditions very uniform copolymers are prepared. The polymerization conditions are (semi)-commercial when the reaction conditions of the polymerization are comparable to a (semi)-commercial run. Typical values of some (semi)-commercial conditions are: temperature 40° C., polymer concentration 60 grams/liter solvent, residence time 10 minutes, ethylene conversion 80%.

Of both copolymers the g' (III)/MWD is determined. RBE is defined as expressed in formula X:

$$RBE = \frac{0.5 - (g'(III)/MWD)_{polyene(D)}}{0.5 - (g'(III)/MWD)_{VNB}} \quad (X)$$

For each polyene (D) used the stated correction must be applied. If there are several polyenes (D) the correction is applied for every polyene (D). The effect of each polyene (D) on the BC is considered as being additive.

The copolymers of the invention are elastomeric. This means that the copolymer has a crystallinity of at most 5%, measured by means of DSC (differential scanning calorimetry), at room temperature and higher temperatures. Room temperature is defined as being 25° C. Preferably the copolymer has a crystallinity of at most 1%, more preferably the copolymer has no crystallinity above 25° C. Even more preferably, the copolymer has no crystallinity above 0° C. The crystallinity is determined from a DSC experiment, in which a polymer sample is heated at a rate of 20° C./minute to 200° C., is kept at that temperature for 5 minutes and is cooled down to −70° C. at a rate of 5° C./minute. The thermal effects that occur are recorded. The %-crystallinity is calculated from the crystallisation enthalpy (ΔH, J/g sample) according to the formula:

$$\%\text{-crystallinity}=\Delta H/2.94. \quad (XI)$$

The copolymers of the invention contain inversions of the α-olefin. In a Ziegler-Natta polymerization α-olefins are in general linked head to tail in order to form a polymer. When an insertion takes place of a subsequent α-olefin, with the α-olefin being incorporated head-to-head (or tail-to-tail) in the polymer chain, an inversion is formed. This phenomenon is known from the literature, e.g. from an article by A. Zambelli et al., Macromolecules 13, 42–9, 1980.

A measure of the number of inversions ($N_{inv}$) can be derived from the $T_{\alpha\beta}$- and $T_{\alpha\alpha}$-signals from a $C^{13}$-NMR scan of the polymer. The inversion-ratio $N_{inv}$ is defined as:

$$N_{inv}=T_{\alpha\beta}/T_{\alpha\alpha} \quad (XII)$$

The $T_{\alpha\alpha}$ signal stems from a $CH_2$-sequence after a 'regular' head-to-tail insertion. The $T_{\alpha\beta}$ signal stems from a $CH_2$-sequence after a head-to-head or tail-to-tail-insertion as shown below.

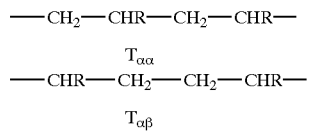

$N_{inv}$ is determined in the following manner: A sample of the elastomeric copolymer is dissolved in deuterated tetrachloroethane ($C_2D_2Cl_4$) to a 10–15 wt % solution. The $^{13}$C-NMR spectrum of the elastomeric copolymer is measured at 125° C. on a Bruker ARX 400 MHz NMR-apparatus. The relaxation-time is 10 seconds. The obtained $^{13}$C-NMR spectrum is analyzed according to S. Di Martino, M Kelchtermans, J. Appl. Polym Science 56, (1995), pages 1781–1787. The $T_{\alpha\alpha}$-peak is found at 44.5–48.5 ppm, the $T_{\alpha\beta}$-peak is located at 34.2–35.9 ppm. The $N_{inv}$ is calculated as the ratio between the integrated areas of the $T_{\alpha\beta}$ and $T_{\alpha\alpha}$ peaks. $N_{inv}$ is larger than 0.8. Preferably $N_{inv}$ is larger than 0.9. In general $N_{inv}$ will be lower than 2.

The copolymers of the invention are suitable for a wide variety of applications, for instance for the manufacture of hoses, conveyor belts and sealing profiles. Optionally, they can be vulcanized by the customary methods by means of substances yielding free radicals, such as peroxides, or with sulphur.

The invention also relates to a process for the preparation of elastomeric copolymers comprising copolymerizing a) ethylene, b) an α-olefin, c) a non-conjugated polyene (C) which in the molecule contains one C═C bond that is polymerizable using a Ziegler-Natta catalyst, and d) optionally a non-conjugated polyene (D) which in the molecule contains two or more C═C bonds, that are polymerizable using a Ziegler-Natta catalyst, by means of a catalyst composition comprising a Group 3, 4, 5 or 6 transition metal and a Group 1, 2, 12 or 13 organometallic compound. Here and hereinafter a Group is a group from the Periodic System of Elements, as defined in the Handbook of Chemistry and Physics, 67th edition 1986–1987, inner front page.

Such a catalyst composition is known from many publications. It is used to obtain, via a so-called Ziegler-Natta polymerization process, said elastomeric copolymers, both elastomeric ethylene/α-olefin copolymers (also called EAM rubbers) and elastomeric ethylene/α-olefin/diene terpolymers (also called EADM rubbers). As α-olefine use is often made of propylene, in which case EPM rubbers or EPDM rubbers are prepared. An example of a catalyst composition and a process for the preparation of elastomeric copolymers of ethylene, an α-olefine and a diene can be found in U.S. Pat. No. 4,575,574 A. There it is stated that the most suitable catalyst composition for such a polymerization consists of a vanadium component and an alkyl aluminium halide.

A drawback of such a catalyst composition, which is often applied in the state of the art, is that the nature of the catalyst composition causes many side reactions, which give rise to all kinds of branching reactions. These branching reactions may give rise to gel formation and strong reactor fouling and in practice make it impossible to prepare polymers with high diene contents in an economically attractive manner.

NL 8102724 A describes compounds that increase the activity of a catalyst composition consisting of a vanadium component and an alkyl aluminium halide. Any effect of such compounds on the degree of branching of copolymers of ethylene, an α-olefin and a diene during the synthesis of the polymer is neither documented nor known.

According to the invention it has been found that specific branching inhibitors are capable of substantially reducing the number of side reactions during copolymerization of ethylene, an α-olefin and a polyene in a Ziegler-Natta polymerization process. This implies that virtually gel-free production of EADM polymers can take place, even up to very high diene contents, with strongly reduced reactor fouling taking place.

As a result of the strong inhibition of the branching reactions through use of the branching inhibitor, polymers are produced that have little branching. In some cases, however, it may be advantageous for processing reasons to have a small amount of long-chain-branching in the polymer. The use of the branching inhibitor according to the invention is eminently suitable for controlled incorporation of branching via the regular Ziegler-Natta polymerization mechanism. The use of small amounts of polyene (D) can give the desired amount of branching.

The branching inhibitor used in the process according to the invention contains an aromatic group and an ester group or amide group that are both coupled to a C atom which contains yet two other groups. The branching inhibitor to be used in the process of the present invention is represented by the following gross formula:

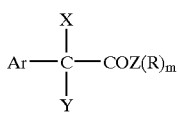

(XIII)

where:
X=a halogen atom,
Y=H, an alkyl group with 1–30 C atoms, an aromatic group with 6–30 C atoms, or a halogen atom,
Z=O or N,
R independently represents H, an alkyl group with 1–30 C atoms or an aromatic group with 6–30 C atoms,
Ar=an aromatic group with 6–30 C atoms
m=1 or 2.

X is a halogen atom. X is preferably a Cl atom.
Y is a hydrogen atom, an alkyl group with 1–30 C atoms, or an aromatic group with 6–30 C atoms or a halogen atom. The alkyl group may be substituted with hydrocarbylgroups or with hydrocarbylgroups containing one or more atoms from the Groups 13 up to and including 17.

The aromatic group (Ar) may be substituted. Examples of such substituents are alkyl groups, substituted alkyl groups, alkoxy groups, halogen groups, amino groups, cyanide groups, nitro groups, thio groups and carboxyl groups. A phenyl group or p-tolyl group is preferred. Y may also be a halogen atom, Cl being preferred. X is preferably a Cl atom, while Y is an aromatic group with 6–10 C atoms or a halogen atom. Even more preferably Y is a phenyl group.

Z is preferably an oxygen (O) atom.
R is hydrogen, an alkyl group with 1–30 C atoms or an aromatic group with 6–30 C atoms. In addition, elements from Groups 13 to 17 may be present. Examples of substituted alkyl groups are pyrolyl, imidazolyl, furyl, pyranyl or thienyl groups. Preferably, R is a methyl group, ethyl group, propyl group, isopropyl group, butyl group, isobutyl group, hexyl group, octyl group, phenyl group or tolyl group. If Z is an N atom, the two R groups may also be coupled, forming a ring structure, for instance a pyrrolyl group, imidazolyl group, pyrazolyl group, piperidyl group or indolinyl group. M is 1 if Z=O; and m=1 or 2 if Z=N.

A special embodiment of the process is obtained if Ar and Y=phenyl group, X=Cl atom, Z=O atom and m=1.

Another advantage of the use of the specific branching inhibitors of the present invention is, that they increase the activity of the catalyst composition.

The catalyst composition that is used in the process according to the invention comprises a transition metal compound and an organometallic compound. In addition, other components may be present, such as Lewis bases. Examples of suitable Lewis bases are: ammonia, amines, pyridines, ethers and esters.

The transition metal compound contains a metal chosen from the Groups 3, 4, 5 or 6. More than one (1) transition metal compound may be present in the catalyst composition. Preference is given to a metal from Group 5, more preference being given to vanadium. Examples of suitable vanadium compounds are $VCl_4$, $VCl_3$, $VCl_3.3THF$ (with THF being a tetrahydrofuran group), $V(acac)_3$ (with acac being an acetylacetonylgroup), $Cp_2VCl$ (with Cp being a substituted or unsubstituted cyclopentadenyl group, indenyl group, tetrahydroindenyl group or fluorenyl group), $VOCl_x(OR')_{3-x}$ (with R' being a substituted or unsubstituted alkyl group with 1–20 C atoms, $0 \leq x \leq 3$).

The organometallic compound contains a metal chosen from Group 1, 2, 12 or 13. More than one (1) organometallic compound may be present in the catalyst composition. Preferably, at least one of the organometallic compounds contains aluminium. This organoaluminium compound preferably satisfies the formula $R'_{3-n}AlY_n$, where $0 \leq n \leq 2$, R'=substituted or unsubstituted alkyl group with 1–20 C atoms and Y=halogen, alkoxy-group with 1–20 C atoms. Examples of suitable organoaluminium compounds are triethyl aluminium, triisobutyl aluminium, trioctyl aluminium, diethyl aluminium ethoxide, diisobutyl aluminium chloride, dimethyl aluminium chloride, diethyl aluminium chloride, methyl aluminium dichloride, ethyl aluminium dichloride, isobutyl aluminium dichloride, isobutyl aluminium sesquichloride, ethyl aluminium sesquichloride, etc. Preference is given to diethyl aluminium chloride and ethyl aluminium sesquichloride.

The branching inhibitor and the other components of the catalyst composition may be fed separately or in several suitable combinations with each other to a polymerization reactor both in dissolved condition (preferably a solvent being chosen that is also used in the associated liquid-phase polymerization) and in a form in which at least one of the components of the catalyst composition is applied to a carrier.

To one skilled in the art various techniques, known in themselves, are known for such an application to a carrier. As carrier material use can be made of, for instance: silica, alumina, zeolite, $MgCl_2$. This so-called heterogenization of the catalyst composition makes it possible to carry out the polymerization in a slurry or as a gas-phase process.

In polymerizations that yield products having an ethylene content between 40 and 65 wt. %, with high diene contents being incorporated, and with the polymer being present in a high concentration in the reactor, gel problems are encountered to a high degree and substantial reactor fouling occurs. Under these conditions a process involving use of the branching inhibitor according to this invention yields great advantages.

The process according to the invention has, surprisingly, made it possible to prepare copolymers having such a critical ethylene content of 40–65 wt. %, while the polyene (C) content is 4–25 wt. %, without the above-mentioned problems.

The effect of the branching inhibitor is strongly expressed when the polymer is present in concentrated form. This is in principle always the case in gas-phase and slurry reactions. In solution processes, in which the polymer is dissolved in a solvent, the concentration of the EADM polymer can be varied strongly. The polymer concentration (PC) may vary between 1 and 200 grammes per liter of solvent. The process according to the invention surprisingly allows virtually gel-free production of the elastomeric copolymer to take place at an PC >50 grammes/liter. More preferably, the PC has a value larger than 70 grams/liter of solvent. The combination of high diene contents (contents higher than 4 wt. %, preferably higher than 8 wt. %, more preferably higher than 12 wt. %) with a high PC (higher than 50 g/l, preferably higher than 70 g/l) indicates the field in which the process according to the invention can extremely suitably be applied.

The polymerization is usually effected at a temperature of between −40 and 200° C., preferably between 10 and 80° C.. The pressure will usually be 0.1–5 MPa, but it is also possible to use higher or lower pressures. The process is preferably carried out continuously, but it can also be carried out semi-continuously or batchwise.

The residence time may vary from a few seconds to a few hours. The residence time will in general be chosen to be between a few minutes and one hour.

The polymerization may take place in a solvent or dispersant that is inert with respect to the catalyst composition, for instance one or more saturated aliphatic hydrocarbons, (such as butane, isobutane, pentane, hexane, cyclohexane, heptane, pentamethyl heptane or petroleum fractions); aromatic hydrocarbons, (for instance benzene or toluene), or halogenated aliphatic or aromatic hydrocarbons, (for instance tetrachloroethylene). Use can be made of such a temperature and pressure that one or more of the monomers used, in particular the α-olefin, for instance propylene, is liquid and is present in such a large amount that this acts as dispersant. In that case another dispersant is not necessary. The process according to the invention can be carried out both in a polymerization reactor filled with gas and liquid, and in a reactor filled entirely with liquid. A heterogenized catalyst composition may be used as well to carry out the polymerization process in solution, suspension or in the gas phase.

Control of the molecular weight of the copolymer can be carried out via techniques that are known to one skilled in the art. In particular this can be effected by using chain length regulators that are known in themselves, such as zinc-compounds and, preferably, with hydrogen. Even very small amounts of hydrogen sufficiently affect the molecular weight. Gel formation problems intensify as the molecular weight of the polymer is higher. The use of the branching inhibitor offers great advantages if polymers with Mooney values ($M_L^{1+4}$, 125° C.) higher than 20, preferably higher than 40, more preferably higher than 60, are produced.

The catalyst composition described in the above is suitable for use, in liquid-phase processes, at room temperature or even higher than that, so that the heat of reaction can be discharged in an efficient manner. This can, as is known, be effected through strong cooling of the feed to the reactors as well as through evaporation of a portion of the reaction medium. After the polymerization the polymer can be finished in various ways. Both the flash-evaporation of the solvent and steam coagulation are eligible for this in liquid-phase processes.

To allow the product to be processed as a rubber, the copolymer can be extended with oil; this is preferably done after the polymerization, but preferably before complete evaporation of the solvent. The addition of agents to make a so-called friable bale is known. This can be effected for instance by addition of, for instance, talcum or by using a system as described in EP 427 339 A. The composition described there, comprising an inorganic separation agent, a thickener and an anionic dispersant, has been found to be highly suitable for use in the products according to the invention.

Below, the invention will be elucidated on the basis of the following examples and comparative experiments, without being limited thereto.

Analysis of the Elastomeric Copolymers

The elastomeric copolymers that were prepared as described in the examples were analyzed by means of Size Exclusion Chromatography and Differential Viscosimetry (SEC-DV) in accordance with the method described in the foregoing. All copolymers were elastomeric and in a DSC analysis they showed no peaks with a peak temperature higher than 25° C.; most copolymers showed no peaks at temperatures higher than 0° C.

The equipment and the experimental conditions for this SEC-DV analysis were as follows:

Equipment: Waters M150c Gel Permeation Chromatograph (GPC) with DRI detector, used for Size Exclusion chromatography Viscotek Differential Viscometer (DV), model 100-02 Detectors in parallel configuration with heated line interface (HLI) Erma solvent degasser ERC-3522 LiChroma III pump pulse dampener (Viscotek) and high-sensitivity accessory (Waters)

Data processing: Viscotek data processing software, UNICAL 4.04 or higher version Columns: Toyo Soda (TSK) GMHXL-HT mixed bed (4×)

Calibration: Universal calibration with linear polyethylene (PE) standard (molecular weight 0.4–4000 kg/mol)

Temperatures: Column oven 140° C. Injector compartment 150° C. Pump solvent compartment 60° C. DV oven 150° C.

SEC conditions: Flow: 1.0 ml/min

Injection volume: 0.300 ml

Solvent/eluent: Distilled 1,2,4-trichlorobenzene with about 1 g/l of Ionol stabilizer Sample preparation: Dissolving for 4 hours at approx. 150° C. Filtration through 1.2 micron Ag filter Sample concentration approx. 1.0 mg/ml By means of differential scanning calorimetry (DSC) the crystallization behaviour of the resulting copolymers was determined.

By means of Fourier transformation infrared spectroscopy (FT-IR), the composition of the copolymers was determined according to the method that is customary in the rubber industry. The FT-IR measurement gives the composition of the various monomers in weight per cents relative to the total composition.

The polymerizations were carried out in a stirred reactor system with a capacity of 3.5 liters. Table 1 presents the polymerization conditions of the continuous polymerization of ethylene, propylene (as the α-olefin), ENB (as the polyene C) and/or VNB (as the polyene D) for Examples 1–12.

This Table gives: the amounts of solvent (boiling point spirit), propylene, ethylene, ENB and VNB, cocatalyst, catalyst and branching inhibitor and the polymerization temperature.

In the Examples I–XII the following catalyst components were used: Al=sesquiethyl aluminium chloride, V=oxyvanadium trichloride (VOCl$_3$), branching inhibitor (BI)—ethyl ester of monochlorodiphenyl acetic acid.

The results of the copolymerization experiments are summed up in Table II. The copolymer production, polymer concentration, composition, Mooney viscosity ($M_1^{1+4}$, 125° C.), Mn, MWD, g' (III), DSC crystallinity, BC and $N_{inv}$ are stated. All copolymers have a high BC.

In the process of the invention use is made of specific branching inhibitors. Comparative experiments were carried out in the absence of a branching inhibitor of the present invention. The other conditions were the same as in Example I.

In comparative experiments B-E Lewis acids and bases were used, and their effect on branching is clearly much less pronounced. All copolymers do not satisfy the BC criterion (formula IV).

| Example | solvent l/hr | C2 g/hr | C3 g/hr | ENB mmol/l solvent | VNB mmol/l solvent | Al mmol/l solvent | V mmol/l solvent | BI mmol/l solvent | Temp ° C. |
|---|---|---|---|---|---|---|---|---|---|
| I | 17.5 | 1009 | 5300 | 56.3 | 0 | 1.43 | 0.048 | 0.19 | 40 |
| II | 17.5 | 506 | 2700 | 54.5 | 0 | 3.15 | 0.105 | 0.42 | 43 |
| III | 17.5 | | | | | | | | 44 |
| IV | 17.5 | 924 | 4140 | 55.4 | 0 | 1.89 | 0.063 | 0.25 | 41 |
| V | 17.5 | 924 | 4130 | 55.4 | 4.9 | 1.89 | 0.057 | 0.23 | 40 |
| VI | 17.5 | 924 | 4130 | 55.4 | 7.3 | 1.89 | 0.057 | 0.23 | 40 |
| VII | 17.5 | 926 | 4130 | 55.4 | 9.8 | 1.89 | 0.057 | 0.23 | 39 |
| VIII | 17.5 | 926 | 4130 | 55.4 | 12.3 | 1.89 | 0.057 | 0.23 | 39 |
| IX | 17.5 | 926 | 4140 | 55.4 | 14.8 | 1.89 | 0.057 | 0.23 | 39 |
| X | 17.5 | 826 | 4260 | 36.4 | 11.4 | 2.32 | 0.077 | 0.31 | 39 |
| XI | 17.5 | 863 | 4200 | 76.6 | 12.2 | 2.76 | 0.092 | 0.37 | 40 |
| XII | 17.5 | 1033 | 3980 | 80.4 | 20.7 | 1.5 | 0.031 | 0.12 | 38 | solvent = boiling point spirit (mixture of hexanes)
C2 = ethylene
C3 = propylene, (as α-olefin)
ENB = ethylidene-norbornene, (as polyene C)
VNB = vinyl-norbornene, (as polyene D)
Al = sesquiethyl aluminium chloride
V = oxyvanadium trichloride
BI = branching inhibitor: ethyl ester of monochlorodiphenyl acetic acid

TABLE 2

| Example | Production g/hr | PC g/l solvent | C2 wt. % | ENB wt. % | VNB wt. % | $M_1^{1+4}$ 125° C. | Mn *1000 | MWD | g' (III) | BC | DSC % crystal >25° C. | $N_{inv}$ |
|---|---|---|---|---|---|---|---|---|---|---|---|---|
| I | 1575 | 90 | 57 | 4.9 | 0 | 85 | 110 | 2, 0 | 0.95 | 0.48 | 0 | 0.95 |
| II | 1470 | 84 | 53 | 5.4 | 0 | 80 | 110 | 2, 0 | 0.97 | 0.48 | 0 | 1.0 |
| III | 1400 | 80 | 50 | 8.5 | 0 | 57 | 95 | 2, 1 | 0.85 | 0.40 | | |
| IV | 1400 | 80 | 56 | 5.6 | 0 | 23 | 63 | 2, 1 | 0.93 | 0.44 | | |
| V | 1350 | 77 | 56 | 6 | 0.3 | 48 | 79 | 2, 3 | 0.85 | 0.51 | | |
| VI | 1350 | 77 | 57 | 6.1 | 0.5 | 37 | 66 | 2, 6 | 0.84 | 0.50 | | |
| VII | 1330 | 76 | 57 | 6.1 | 0.75 | 41 | 67 | 2, 7 | 0.84 | 0.53 | 0 | 1.0 |
| VIII | 1310 | 75 | 57 | 6.1 | 0.87 | 39 | 64 | 2, 7 | 0.83 | 0.54 | | |
| IX | 1310 | 75 | 57 | 6.2 | 1.02 | 42 | 61 | 3, 2 | 0.78 | 0.50 | | |
| X | 1330 | 76 | 53 | 4.1 | 0.87 | 25 | 59 | 2, 7 | 0.82 | 0.54 | 0 | |
| XI | 1380 | 79 | 52 | 8.3 | 0.86 | 46 | 51 | 3, 1 | 0.79 | 0.49 | 0 | |
| XII | 1240 | 71 | 64 | 8.2 | 1.34 | 45 | 65 | 3, 1 | 0.75 | 0.53 | 0.3 | |

TABLE 3

| Comparative Experiment | BI | C2 wt. % | ENB wt. % | VNB wt. % | $M_1^{1+4}$ 125° C. | MWD | g' (III) | BC |
|---|---|---|---|---|---|---|---|---|
| A | — | 57 | 5.1 | 0 | 87 | 2.8 | 0.82 | 0.29 |
| B | DCEM | 56 | 4.5 | 0 | 79 | 2.5 | 0.89 | 0.36 |
| C | PCCE | 56 | 4.6 | 0 | 81 | 2.3 | 0.94 | 0.42 |
| D | BTCB | 54 | 4.3 | 0 | 72 | 3.1 | 0.86 | 0.28 |
| E | ETA | 55 | 4.3 | 0 | 78 | 4.2 | 0.85 | 0.2 |

BTCB: butyl 4,4,4 trichloro but-2-transenoate
DCEM: dichloroethyl malonate
ETA: ethyl trichloroacetate
PCCE: perchlorocrotonic acid ethyl ester

What is claimed is:

1. A process for the preparation of elastomeric copolymers consisting essentially of:
   copolymerising, in the presence of a catalyst composition,
   a) ethylene,
   b) an α-olefin,
   c) a non-conjugated polyene (C) containing in its molecule one C=C bond polymerizable using a Ziegler-Natta catalyst, and
   d) a non-conjugated polyene (D) containing in its molecule two or more C=C bonds polymerizable using a Ziegler-Natta catalyst,
   wherein said copolymers have the following properties
   i the weight ratio between the ethylene content and the α-olefin content is between 80/20 and 40/60;
   ii the polyene (C) content is 4 to 30 wt. %; and
   iii the polyene (D) content is 0.1 to 5 wt. %;
   and wherein said catalyst composition comprises
   (1) a Group 3, 4, 5 or 6 transition metal;
   (2) a Group 1, 2, 12 or 13 organometallic compound; and
   (3) a compound represented by the following formula

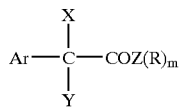

wherein:
   X represents a halogen atom;
   Y represents H, an alkyl group with 1–30 C atoms, an aromatic group with 6–30 C atoms, or a halogen atom;
   Z represents O or N;
   R independently represents H, an alkyl group with 1–30 C atoms or an aromatic group with 6–30 C atoms;
   Ar represents an aromatic group with 6–30 C atoms;
   m represents 1 or 2,
   and wherein said copolymerising is carried out in a gas phase, in slurry, or in solution, and wherein said copolymers, when copolymerised in solution, are present in a polymer concentration greater than 70 grams per liter of solvent.

2. A process according to claim 1, wherein X is a Cl atom.

3. A process according to claim 1, wherein Y is an aromatic group with 6–10 C atoms or a halogen atom.

4. A process according to claim 1, wherein Y is a phenyl group or a Cl atom.

5. A process according to claim 1, wherein Y is a phenyl group and Z is O (oxygen).

6. A process according to claim 1, wherein the transition metal is vanadium.

7. A process according to claim 1, wherein the organometallic compound contains aluminum.

8. A process according to claim 1, wherein the organometallic compound is selected from the group consisting of diethyl-aluminum-chloride and ethyl-aluminum-sesquichloride.

9. An elastomeric copolymer prepared by copolymerising
   a) ethylene,
   b) an a-olefin,
   c) a non-conjugated polyene (C) containing in its molecule one C=C bond polymerizable using a Zieglar-Natta catalyst, and
   d) a non-conjugated polyene (D) containing in its molecule two or more C=C bonds polymerizable using a Ziegler-Natta catalyst,
   wherein:
   i the weight ratio between the ethylene content and the α-olefin content in the copolymer is between 80/20 and 40/60
   ii the polyene (C) content in the copolymer is 4 to 30 wt. % relative to the copolymer
   iii the polyene (D) content in the copolymer is 0.1 to 2 wt. % relative to the polymer; and
   iv a branching coefficient of the copolymer, BC*, is such that $0.57-0.022*[C] \leq BC^* \leq 0.7$
   where $$BC = \frac{g'(III)}{MWD} + \Sigma_D(0.25*[D]^{0.5})$$

[C]=polyene (C) content of the copolymer by wt. %, relative to the total weight of the copolymer;
   [D]=polyene (D) content of the copolymer by wt. %, relative to the total weight of the copolymer;
   $\Sigma_D$=summation of all contributions to BC* of the polyenes D present in the elastomeric copolymer;
   $g'III=([\eta]/[\eta]*)^{1.725}$;
   $[\eta]$=weight average intrinsic viscosity, in dl/g;
   $[\eta]*$=apparent weight average intrinsic viscosity of a linear copolymer with an ethylene/α-olefin composition corresponding to the ethylene/ α-olefin composition of the copolymer, in dl/g; and
   MWD=molecular weight distribution.

10. An elastomeric copolymer consisting essentially of the copolymer prepared by copolymerising in gas phase, slurry or solution,
   a) ethylene,
   b) an a-olefin,
   c) a non-conjugated polyene (C) containing in its molecule one C=C bond polymerizable using a Zieglar-Natta catalyst, and
   d) a non-conjugated polyene (D) containing in its molecule two or more C=C bonds polymerizable using a Ziegler-Natta catalyst,
   wherein:
   i. the weight ratio between the ethylene content and the α-olefin content in the copolymer is between 80/20 and 40/60
   ii. the polyene (C) content in the copolymer is 4 to 30 wt. % relative to the copolymer
   iii. the polyene (D) content in the copolymer is 0.1 to 5 wt. % relative to the polymer; and
   iv. a branching coefficient (BC) of the copolymer is such that $0.57-0.022*[C] \leq BC \leq 0.7$
   where $$BC = \frac{g'(III)}{MWD} + 0.25*RBE*[D]^{0.5} + 0.0855*[DCPD];$$

[C]=polyene (C) content of the copolymer by wt. %, relative to the total weight of the copolymer;
   [D]=polyene (D) content of the copolymer by wt. %, relative to the total weight of the copolymer;
   RBE=relative branching efficiency of the polyene (D) relative to vinyl norbornene;
   [DCPD]=dicyclopentadiene content of the copolymer by wt. % relative to the total weight of the copolymer;

g'III=$([\eta]/[\eta]^*)^{1.725}$;

[η]=weight average intrinsic viscosity, in dl/g;

[η]*=apparent weight average intrinsic viscosity of a linear copolymer with an ethylene/α-olefin composition corresponding to the ethylene/α-olefin composition of the copolymer, in dl/g; and MWD=molecular weight distribution; and v. when the monomers a), b), c) and d) are copolymerized in solution, the copolymer concentration is greater than 70 grams per liter of solvent.

11. An elastomer copolymer according to either one of claim 10 or claim 9, wherein the polyene (C) is selected from the group consisting of 1,4-hexadiene and 5 ethylidene-2-norbornene.

12. An elastomeric copolymer according to either one of claim 10 or claim 9, wherein the polyene (D) is selected from the group consisting of vinylnorbornene, dicyclopentadiene, norbornadiene, and 1,5-hexadiene.

13. An elastomeric copolymer according to any one of claim 10 or claim 9, wherein the polyene (C) is 5-ethylidene-2-norbornene and polyene (D) is vinylnorbornene and/or dicyclopentadiene.

14. An elastomeric copolymer according to any one of claim 10 or claim 9, wherein the polyene (C) content is 4 to 20 wt. %.

15. An elastomeric copolymer according to claim 14, wherein the polyene (C) content is 7 to 15 wt. %.

16. An elastomeric copolymer according to any one of claim 10 or claim 9, wherein the elastomeric copolymer has no crystallinity above 25° C. as determined by DSC.

17. An elastomeric copolymer according to any one of claim 10 or claim 9, wherein the elastomeric copolymer has a Mooney viscosity of at least 20.

18. An elastomeric copolymer according to any one of claim 10 or 9, wherein the elastomeric copolymer has a molecular weight distribution between 1.8 and 4.0.

19. An elastomeric copolymer according to any one of claim 10 or claim 9, wherein the elastomeric copolymer has a number of inversion, $N_{inv}$, greater than 0.8.

20. A process according to claim 1, wherein the polyene (D) content is 0.1 to 2 wt. %.

21. A process according to claim 1, wherein said process is a continuous process.

22. An elastomeric copolymer obtained by the process of claim 1.

23. An elastomeric copolymer obtained by the process of claim 20.

24. An elastomeric copolymer prepared by copolymerising a) ethylene, b) an α-olefin, c) a non-conjugated polyene (C) containing in its molecule one C=C bond polymerizable using a Ziegler-Natta catalyst, and d) a non-conjugated polyene (D) containing in its molecule two or more C=C bonds polymerizable using a Ziegler-Natta catalyst, wherein:

i the weight ratio between the ethylene content and the α-olefin content in the copolymer is between 80/20 and 40/60 ii the polyene (C) content in the copolymer is 4 to 30 wt. % relative to the copolymer iii the polyene (D) content in copolymer is 0.1 to 5 wt. % relative to the polymer; and iv a branching coefficient of the copolymer, BC*, is such that $0.57-0.022*[C] \leq BC^* \leq 0.7$ where $$BC = \frac{g'(\text{III})}{MWD} + \Sigma_D(0.25*[D]^{0.5})$$

[C]=polyene (C) content of the copolymer by wt. %, relative to the total weight of the copolymer;

[D]=polyene (D) content of the copolymer by wt. %, relative to the total weight of the copolymer;

$\Sigma_D$=summation of all contributions to BC* of the polyenes D present in the elastomeric copolymer;

g'III=$([\eta]/[\eta]^*)^{1.725}$;

[η]=weight average intrinsic viscosity, in dl/g;

[η]*=apparent weight average intrinsic viscosity of a linear copolymer with an ethylene/α-olefin composition corresponding to the ethylene/α-olefin composition of the copolymer, in dl/g; and MWD=molecular weight distribution.

* * * * *